Patented Feb. 18, 1930

1,747,540

UNITED STATES PATENT OFFICE

ALFRED FISCHESSER, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR DISCHARGING DYED CELLULOSE-ACETATE MATERIALS

No Drawing. Application filed October 16, 1926, Serial No. 142,149, and in Germany June 17, 1926.

Dyed cellulose acetate materials can not be discharged like other artificial or natural dyed fibers by the reducing agents, customarily used for discharging. The generally used alkali metal salts of the formaldehyde-sulfoxylic acid do not discharge the dyed cellulose acetate materials or at best discharge them very imperfectly. Certain additions to the discharge, such as sulfocyanic salts have been proposed to improve the effect, but do not give satisfactory results.

I have now found that the zinc salt of the formaldehyde-sulfoxylic acid of the formula $Zn.(H_2SO_2)_2.2CH_2O$ which is described in Loewenthal, Handbuch der Faerberei, 3rd Edition, page 475, and which is commercially known as hyraldite Z soluble concentrated or decroline soluble concentrated, easily discharges dyed cellulose acetate materials. Further additions are not necessary and therefore my discharging process is an essentially improved and simplified one. My observation is very surprising, because the same result is not obtained by using discharges composed of hydrosulfite-formaldehyde compounds and oxide or carbonate of zinc according to British Patent No. 2573 of 1904. A specific discharging effect of the zinc salt of the formaldehyde-sulfoxylic acid of the above given formula as to dyed cellulose acetate material is to be assumed.

The following example may illustrate my process:

240 parts of neutral sulfoxylate of zinc (soluble hyraldite Z concentrated) are well mixed with 60 parts of glycerin, 100 parts of water and 600 parts of gum mucilage consisting of a mixture of equal portions of water and gum solution. Then the mixture is heated to 50–60° C. for some minutes and cooled down while stirring.

Such a discharge is printed on the dyed cellulose acetate fabric, then the material is somewhat dried, steamed for some minutes, washed and finally dried.

In this manner a pure white discharge effect is obtained.

For producing colored discharges suitable non-reduceable basic dyestuffs may be added to the discharge.

I claim:

1. The process which comprises printing a zinc salt of formaldehyde-sulfoxylic acid of the formula $Zn.(H_2SO_2)_2.2CH_2O$ on dyed cellulose acetate material, steaming the material and finishing it in the usual manner.

2. Dyed cellulose acetate material which has been discharged by the process of claim 1.

In testimony whereof, I affix my signature.

ALFRED FISCHESSER.